(12) United States Patent
Lin et al.

(10) Patent No.: US 11,058,122 B2
(45) Date of Patent: Jul. 13, 2021

(54) LARGE-SCALE MULTIFUNCTIONAL MACHINE FOR MAKING RICE NOODLES

(71) Applicant: Central South University of Forestry and Technology, Changsha (CN)

(72) Inventors: Qinlu Lin, Hunan (CN); Simin Zhao, Hunan (CN); Yunhui Cheng, Hunan (CN); Lizhong Lin, Hunan (CN); Huaxi Xiao, Hunan (CN); Tao Yang, Hunan (CN); Huiqiu Chen, Hunan (CN); Lin Zhang, Hunan (CN); Dong Xu, Hunan (CN); Yuqin Ding, Hunan (CN)

(73) Assignee: Central South University Of Forestry and Technology, Hunan (CN)

( * ) Notice: Subject to any disclaimer, the term of this patent is extended or adjusted under 35 U.S.C. 154(b) by 365 days.

(21) Appl. No.: 16/165,063

(22) Filed: Oct. 19, 2018

(65) Prior Publication Data
US 2019/0116806 A1 Apr. 25, 2019

(30) Foreign Application Priority Data
Oct. 20, 2017 (CN) .......................... 201710981387.7

(51) Int. Cl.
| | |
|---|---|
| *A21C 11/16* | (2006.01) |
| *A23L 7/109* | (2016.01) |
| *A21C 1/00* | (2006.01) |
| *A23L 5/10* | (2016.01) |
| *A21C 13/02* | (2006.01) |

(52) U.S. Cl.
CPC .............. *A21C 11/16* (2013.01); *A21C 1/003* (2013.01); *A21C 13/02* (2013.01); *A23L 5/13* (2016.08); *A23L 7/109* (2016.08); *A23V 2002/00* (2013.01)

(58) Field of Classification Search
CPC ......... A21C 1/003; A21C 11/16; A21C 13/02; A23L 5/13; A23L 7/109; A23V 2002/00
USPC ........................................................... 99/326
See application file for complete search history.

(56) References Cited

FOREIGN PATENT DOCUMENTS

| CN | 102783609 | * | 11/2012 |
| KR | 20120124897 | * | 11/2012 |
| WO | WO2008052437 | * | 5/2008 |

* cited by examiner

*Primary Examiner* — Dana Ross
*Assistant Examiner* — Joseph W Iskra
(74) *Attorney, Agent, or Firm* — Saul Ewing Arnstein & Lehr LLP; Brian R. Landry; Paul Leicht

(57) ABSTRACT

A large-scale multifunctional rice noodle making machine, along the direction of materials delivery comprises sequentially a rice lifting machine inlet, a rice lifting machine, a fermenter, a rice feeder, a rice-flour outlet, an auxiliary ingredients machine, a continuously mixing and conveying machine, an outlet, a self-ripening and shaping machine, a hot water circulation tank, a rice-flour feeder, an extruding machine, a conveyor of aging machine, a fan, an aging machine, a first noodle loosen machine, a noodle steamer, an out-feed channel, a second noodle loosen machine, a conveyor, an inlet, an inner packaging machine, a conveyor I, a weighing scale, a metal detector, a conveyor II, a sterilizer, and a rice noodle collector. The present invention relates to a large-scale multifunction rice noodle machine, which can automatically and efficiently produce a variety of rice noodles, such as fermented and non-fermented rice noodles.

5 Claims, 3 Drawing Sheets

LARGE-SCALE MULTIFUNCTIONAL MACHINE FOR MAKING RICE NOODLES

CROSS-REFERENCE TO RELATED APPLICATION

This application claims the benefit of priority under 35 U.S.C. § 119 to Chinese Patent Application No. CN201710981387.7, filed Oct. 20, 2017. The entire content of this application is hereby incorporated by reference herein.

TECHNICAL FIELD

The present invention generally relates to a large-scale multifunctional machine for making rice noodles.

BACKGROUND ART

Existing machines for making rice noodles are designed for producing single type of rice noodles and cannot satisfy a variety of tasting needs of customers. Traditional rice noodles are made manually or by semi-mechanical machines; as a result, the efficiency is low and the process is labor-consuming. The manual operations of processing parameters also lead to unstable producing conditions.

SUMMARY OF THE INVENTION

The aim of this invention is to provide a high-efficiency and multi-type multifunctional large-scale rice-noodles-making machine.

The present invention is achieved by the following technical solutions: a large-scale multifunctional rice noodles making machine, along the direction of materials delivery comprising sequentially, an inlet of a rice lifting machine, the rice lifting machine, a fermenter, a rice feeder, a rice-flour outlet, an auxiliary ingredients machine, a continuously mixing and conveying machine, an outlet, a self-ripening and shaping machine conveyor, a hot water circulation tank, a rice-flour feeder, a extruding machine, a conveyor of aging machine, a fan, an aging machine, a first noodle-loosening machine, a noodle steamer, an out-feed channel, a second noodle-loosening machine, a conveyor, an inlet, an inner-packaging machine, a conveyor I, a weighing scale, a metal detector, a conveyor II, a sterilizer, and a rice noodle collector.

A production line includes the following steps:

(a) feeding rice through the inlet and lifting the rice to the fermenter by the rice lifting machine, (b) soaking and cleaning the rice, then fermenting if necessary, and delivering the rice to the rice feeder after fermentation, (c) mixing rice-flour obtained from the rice-flour outlet with auxiliary ingredients in the auxiliary ingredient machine, (d) the mixed rice-flour from the outlet of the continuous mixing and conveyoring machine being delivered onto the conveyor of the self-ripening and shaping machine, (e) delivering rice-flour to the rice-flour feeder, which is connected to the extruding machine, (f) the hot water tank surrounding the rice-flour feeder and extruding machine, and heating up the rice-flour therein, (g) the fan immediately cooling the rice noodles produced by the extruding machine, (h) sending the rice noodles to the aging machine to age by the conveyor of the aging machine, (i) sending the rice noodles to the noodle steamer after being loosened from the first noodle loosen machine, (j) the rice noodle from the out-feed channel being loosened in the second noodle loosen machine, (k) cutting the rice noodles loosened by the second noodle loosen machine and packaging the rice noodles in the rice noodle inner-packaging machine, and (l) the packaged rice noodle becoming final products after going through the weighing scale, the metal detector by the conveyor I, and the sterilizer by the conveyor II, and arriving the rice noodle collector.

According to the said large-scale multifunctional rice noodle making machine, the product line can include the fermenter, wherein the rice from the rice lifting machine is soaked and fermented.

The said large scale multifunctional rice noodle machine can include a hot water circulation tank I and a hot water circulation tank II, which circle the rice-flour feeder and the extruding machine and heat up the materials.

The rice-flour can be fed into the extruding machine from the rice-flour feeder, and the frequencies of the rice-flour feeder and the extruding machine can be adjusted to keep thickness of the rice noodles steady.

The said large scale multifunctional rice noodle machine can produce dozens of rice noodles in different types, such as non-fermented dry rice noodles, non-fermented wet rice noodles, semi-dry rice noodles, and so forth.

The invention has reasonable structure, stable performance, and long service life. The invention can produce a variety of rice noodles and can greatly improve production efficiency and satisfy different costumers' needs.

DESCRIPTION OF THE PREFERRED EMBODIMENTS

The present invention will be further described with reference to the drawings and embodiments.

Figure 1:
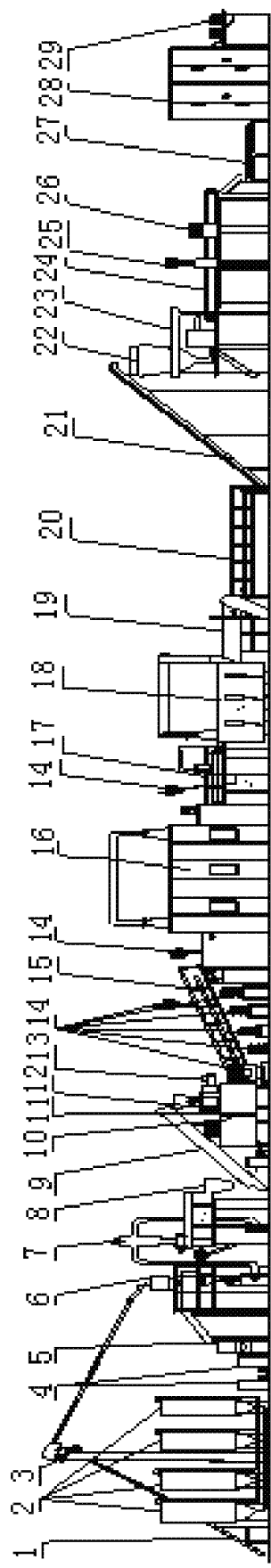
FIG. 1 is a schematic view of the structure of the present large scale multifunctional rice noodle machine.
Figure 2:
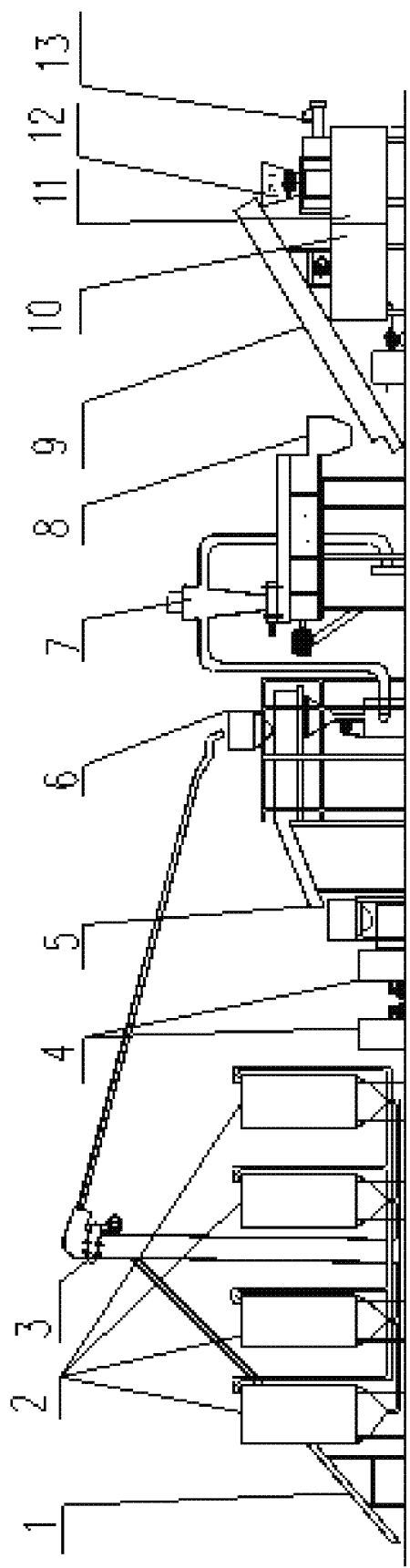
FIG. 2 is a schematic enlarged view of the front section of the embodiment shown in FIG. 1.
Figure 3:
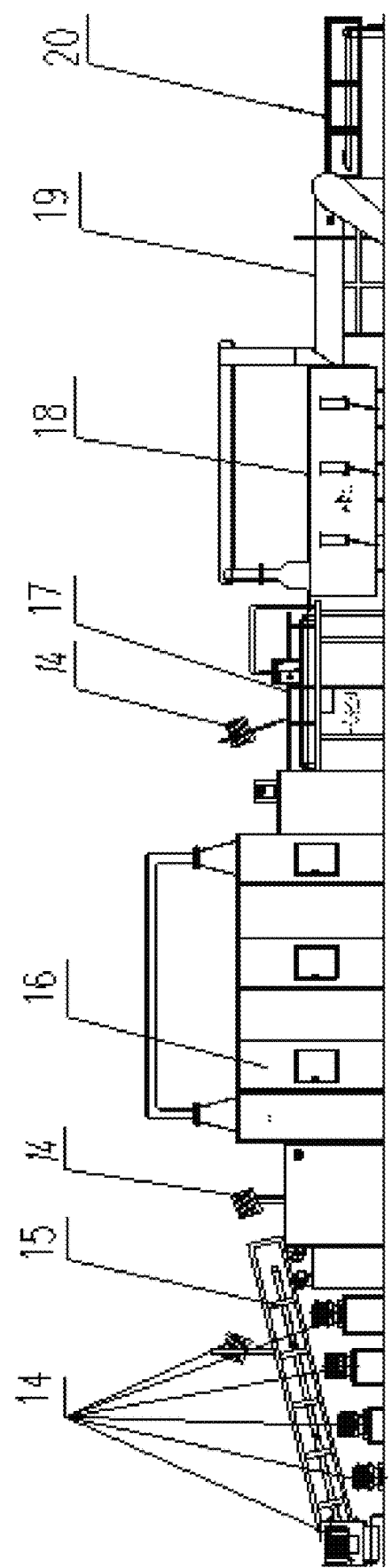
FIG. 3 is a schematic enlarged view of the middle section of the embodiment shown in FIG. 1.
Figure 4:
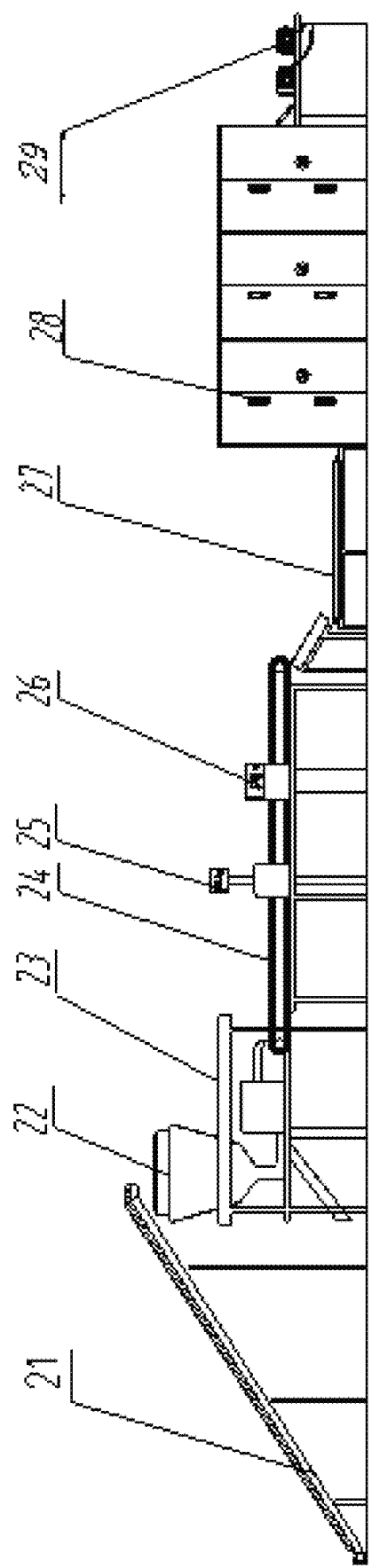
FIG. 4 is a schematic enlarged view of the rear section of the embodiment shown in FIG. 1.

According to FIG. 1 to FIG. 4, the embodiment can include, e.g., sequentially along the direction of materials delivery, rice lifting machine inlet 1, rice lifting machine 3, fermenter 2, rice feeder 6, rice-flour outlet 5, auxiliary ingredients machine 4, continuously mixing and conveying machine 7, outlet 8, self-ripening and shaping machine conveyor 9, hot water circulation tank I 10, hot water circulation tank II 11, rice-flour feeder 12, extruding machine 13, conveyor of aging machine 15, fan 14, aging machine 16, first noodle-loosening machine 17, noodle steamer 18, out-feed channel 19, second noodle-loosening machine 20, conveyor 21, inlet 22, inner-packaging machine 23, conveyor I 24, weighing scale 25, metal detector 26, conveyor II 27, sterilizer 28, and rice noodle collector 29.

Rice can be fed from the inlet 1 and then lifted to the fermenter 2 by the rice lifting machine 3.

The rice can be delivered to the rice feeder 6 after soaking and cleaning, and fermenting if necessary, by the rice lifting machine 3.

Rice flour coming out from the rice-flour outlet 5 can be with auxiliary ingredients such as corn (maize) flour in the auxiliary ingredient machine 4.

The mixed rice-flour can be sent onto the conveyor 9 of the self-ripening and shaping machine from the outlet 8 of the continuous mixing and conveying machine 7.

Rice flour can be delivered to the flour feeder 12, which can be connected to the extruding machine 13.

The hot water tank I 10 as well as the hot water tank II 11 can surround the flour feeder 12 and extruding machine 13 and heat up the rice flour therein.

The fan 14 can cool (e.g., immediately) the rice noodles emerging from the extruding machine 13.

The rice noodles can be sent to the aging machine 16 to age by the conveyor 15 of the aging machine 16.

The rice noodles can be loosened by the first noodle-loosening machine 17 and then sent to the noodle steamer 18.

The rice noodles can be loosened in the second noodle-loosening machine 20 after emerging from the out-feed channel 19.

The rice noodles loosened in the noodle-loosening machine can be sent to the inlet 22 through the conveyor 21, where the noodle being cut and packaged in the rice noodle inner-packaging machine 23.

The packaged rice noodle can become final qualified products after passing through the weighing scale 25 and the metal detector 26 (e.g., by the conveyor I 24), the sterilizer 28 (e.g., by the conveyor II 27), and then arriving at the rice noodle collector 29.

Rice can be delivered to the fermenter 2 by the rice lifting machine after feeding in inlet 1. Rice can be soaked and fermented in the fermenter 2 at certain soaking temperatures. When the environment temperature is below 10 Degrees Celsius, the soaking temperature can be set to 45-50 Degrees Celsius; when the environment temperature is between 10 and 30 Degrees Celsius, the initial soaking temperature can be set to 40-45 Degrees Celsius; when the environment temperature is above 30 Degrees Celsius, the initial soaking temperature can be set to 35-40 Celsius. The pH value in the fermenter 2 can be set to 4.0±0.5, and the weight ratio of water to raw rice materials can be 1-1.4:1. Microzyme or lactobacillus can be added to the fermenting process. The soaking time can be 20-30 hours. If the fermentation process does not work as expected, the soaking time can be prolonged.

After the soaking process, the rice can be milled to rice flour by the rice feeder 6. The frequency of the rice feeder can be controlled between 18-22 Hz. Corn starch can be added in a proportion of 10 wt %-15 wt % (as reference), and the frequency of motor can be between 35-40 Hz. Cassava starch can be added in a proportion of 10 wt %-15 wt % (as reference), and the frequency of motor can be controlled between 15-20 Hz. The rice feeding rate can match the auxiliary ingredient adding rate. If the rice feeding rate is changed, the starch adding rate can be measured and adjusted in order to satisfy the standard of the auxiliary ingredient adding proportion.

Water can be added to the flow rate of 320 grams per minute (as reference) to make the water proportion of the pre-mixed rice-flour reaches 30%-37%. The water flow rate can be adjusted as appropriate according to the trickle condition and stirred evenly.

The rice-flour can be transported to the outlet 8 of the continuous mixing and conveying machine 7, and then to the rice-flour feeder 12 by conveyor 9 of the self-ripening and shaping machine.

The rice-flour feeder 12 can be surrounded by the hot water circulation tank I 10 and the hot water circulation tank II 11.

The rice-flour can be fed into the rice-flour feeder 12 and then enter into the extruding machine 13. The frequencies of rice-flour feeder 12 and the extruding machine 13 can be adjusted to produce a stable thickness of rice noodle. The first-stage extrusion frequency can be controlled at 40-45 Hz, the secondary extrusion frequency can be controlled at 30-35 Hz, and the mesh belt frequency can be controlled at 30-35 Hz.

The water temperature of the hot water circulation can be adjusted to ensure the degree of ripening of the rice-flour. The target temperature of the hot water circulation tank I 10 can be controlled at 95-100 Degrees Celsius, and the target temperature of the hot water circulation tank II 11 can be controlled at 60-65 Degrees Celsius.

The rice noodles extruded from the extruding machine 13 can be cooled by the fan 14 and aged in the aging machine 16 through the aging machine conveyor 15. The aging temperature can be adjusted to 30-55 Degrees Celsius with steaming. The aging temperature can be adapted, configured, and/or programmed to maintain a variety of temperatures such as 30-35 Degrees Celsius, 40-45 Degrees Celsius, 50-55 Degrees Celsius, and the like. The humidity can be about 90%. The aging time can be 4-8 hours.

The rice noodles from the aging machine can be sent to the first loosening machine 17, and then to the steamer 18. The steaming time can be 3-8 minutes. The frequency of the steamer can be controlled at 15-30 Hz. The steaming pressure can be 0.02-0.025 MPa, and the steaming temperature can be 85-95 Degrees Celsius. The rice noodles from the out-feed channel 19 of the steamer can be delivered to the secondary loosening machine 20, and then pass through the conveyor 21, and enter the inlet 22 to be washed. The temperature of the rice noodle washing water can be in range of 9-35 Degrees Celsius, and the rice noodles can be fully washed to be separated from each other and not stick together.

The rice noodles can be sent to the inner-packaging machine 23 to seal and test, and can be delivered by the conveyor to pass through the weighing scale 25, the metal detector 26, and the sterilizer 27. The steaming pressure for sterilizing can be above 0.2 MPa, and the sterilizing temperature can be 91-93 degrees Celsius. The sterilizing time can be ≥31 minutes, and the rice noodle packet can be cooled to below 42 degrees Celsius before entering the rice noodle collector 29.

The invention claimed is:
1. A large-scale multifunctional rice-noodle-making machine comprising:
   a rice-lifting machine comprising an inlet;
   a fermenter in communication with the rice-lifting machine, wherein the rice-lifting machine is adapted and configured to receive rice through the inlet and lift the rice to the fermenter;
   a rice feeder comprising a rice-flour outlet, the rice feeder in communication with the fermenter, wherein the fermenter is adapted or configured to soak and clean the rice, and deliver the rice to a rice feeder after fermentation;
   an auxiliary ingredients machine in communication with the rice-flour outlet, wherein:
      the rice feeder is adapted and configured to transfer rice flour via the rice-flour outlet to an auxiliary ingredients machine; and the auxiliary ingredients machine is adapted and configured to mix the rice flour obtained from the rice-flour outlet with auxiliary ingredients to produce mixed rice flour;

a continuously-mixing-and-conveying machine comprising a continuously-mixing-and-conveying-machine outlet;

a self-ripening-and-shaping machine conveyor in communication with the continuously-mixing-and-conveying-machine outlet, wherein the continuously-mixing-and-conveying-machine outlet is adapted and configured to deliver the mixed rice flour from the continuously-mixing-and-conveying-machine outlet onto the self-ripening-and-shaping-machine conveyor;

a rice-flour feeder in communication with the self-ripening-and-shaping machine, wherein the self-ripening-and-shaping machine conveyor is adapted and configured to deliver the mixed rice flour to the rice-flour feeder;

an extruding machine in communication with the rice-flour feeder;

a hot water circulation tank surrounding the rice-flour feeder and the extruding machine, wherein the hot water tank is adapted and configured to heat the rice flour within the rice-flour feeder and the extruding machine;

an aging machine in communication with the extruding machine, the aging machine comprising:
 a fan adapted and configured to cool the rice noodles produced by the extruding machine; and
 an aging-machine conveyor;

a first noodle-loosening machine in communication with the aging machine;

a noodle steamer in communication with the first noodle-loosening machine, wherein the first noodle-loosening machine is adapted and configured to send the rice noodles to the noodle steamer after being loosened from the first noodle-loosening machine;

an out-feed channel in communication with the noodle steamer;

a second noodle-loosening machine in communication with the out-feed channel, wherein the second noodle-loosening machine is adapted and configured to loosen the rice noodles from the out-feed channel;

a second conveyor in communication with the second noodle-loosening machine;

an inner-packaging machine comprising an inner-packaging machine inlet, the inner-packaging machine in communication with the second conveyor, wherein the inner-packaging machine is adapted and configured to cut the rice noodles loosened by the second noodle-loosening machine and package the rice noodles;

a third conveyor in communication with the inner-packaging machine;

a weighing scale in communication with the third conveyor;

a metal detector in communication with the weighing scale;

a fourth conveyor in communication with the metal detector;

a sterilizer in communication with the fourth conveyor; and a rice noodle collector in communication with the sterilizer.

2. The large-scale multifunctional rice-noodle-making machine of claim 1, wherein the large-scale multifunctional rice-noodle-making machine is further adapted and configured to control the fermenter to ferment rice from the rice lifting machine to produce fermented rice noodles.

3. The large-scale multifunctional rice-noodle-making machine of claim 1, further comprising:
 a second hot water circulation tank encircling the rice-flour feeder and the extruding machine, the second hot water circulation tank controlled to heat the materials within the rice-flour feeder and the extruding machine.

4. The large-scale multifunctional rice-noodle-making machine of claim 1, wherein:
 the rice flour is fed into the extruding machine from the rice-flour feeder; and
 the frequencies of the rice-flour feeder and the extruding machine are controlled to keep thickness of the rice noodles steady.

5. The large-scale multifunctional rice-noodle-making machine of claim 1, wherein each of non-fermented dry rice noodles, non-fermented wet rice noodles, and semi-dry rice noodles can be produced.

* * * * *